Aug. 29, 1944.   R. BISCHOFF   2,356,815
CHECK VALVE
Filed Aug. 26, 1942
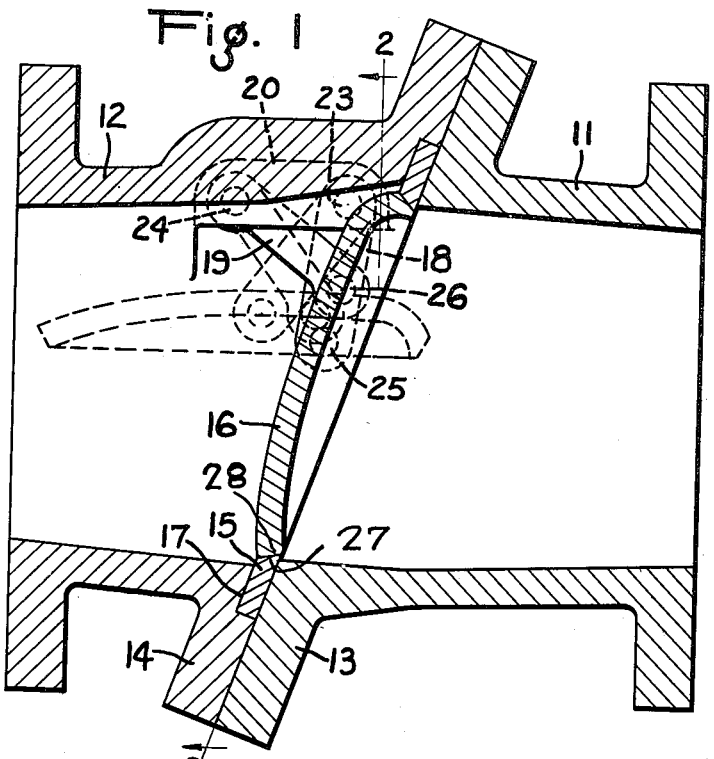
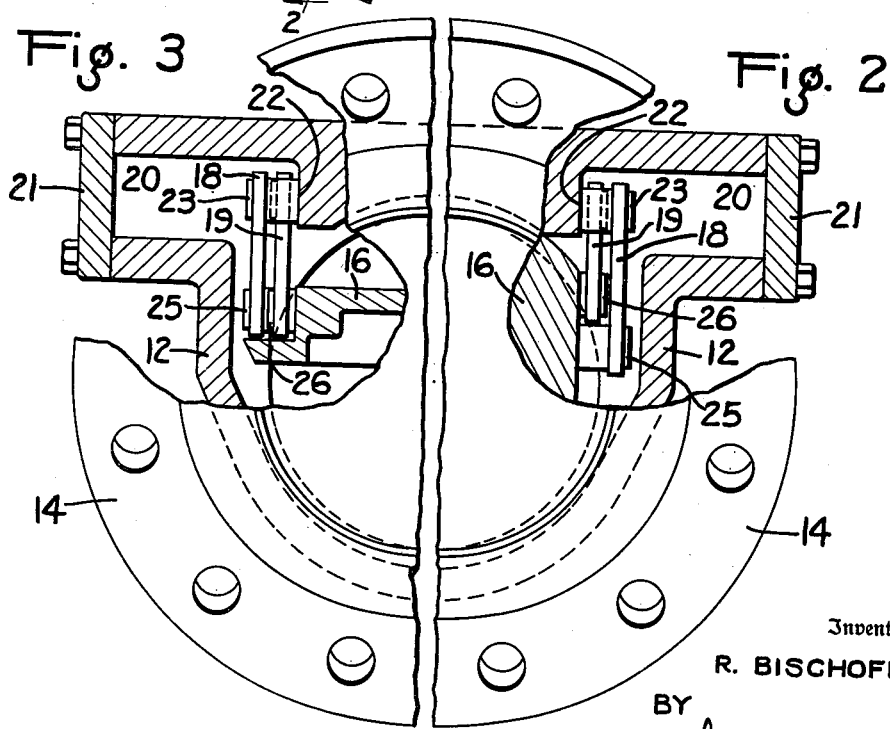
Inventor
R. BISCHOFF
BY
Malcolm F. Gannett
Attorney Patented Aug. 29, 1944

2,356,815

UNITED STATES PATENT OFFICE 2,356,815

CHECK VALVE

Robert Bischoff, Troy, N. Y.

Application August 26, 1942, Serial No. 456,135

7 Claims. (Cl. 251—123)

This invention relates to disk valves adapted for use as check valves.

An object of the invention is to provide an improved check valve in which the valve disk is supported in a housing by means of supporting links and tilting links arranged in such a manner that when the pressure of fluid on the inlet side of the disk decreases to a point where it balances the fluid pressure on the outlet side, the valve disk will be unbalanced and will automatically move to closed position.

Another object of the invention is to provide an improved disk valve in which the valve disk is supported by a plurality of links arranged in such a manner that the valve disk is hydraulically unbalanced.

Another object of the invention is to provide an improved disk valve in which the valve disk is suspended by two sets of links, one set of links being adapted to support the valve disk and the other set of links being adapted to effect a tilting movement of the valve disk so that the valve disk is moved to a horizontal position downstream with respect to its seat when the fluid pressure acting on the upstream side of the valve exceeds a predetermined amount.

With the foregoing and other objects and advantages in view, the invention consists in the preferred construction and arrangement of the several parts which will be hereinafter more fully described and claimed.

In the accompanying drawing:

Fig. 1 is a longitudinal section through a valve constructed according to the present invention, showing the valve disk seated in closed position by full lines and in open position by broken lines; and Figs. 2 and 3 are half sectional views taken on the line 2—2 of Fig. 1, the valve disk being shown seated in Fig. 2, and being shown unseated in Fig. 3.

Referring to the drawing, the improved valve comprises a housing or valve body formed of two sections 11 and 12, having their meeting ends formed with flanges 13, 14, respectively, by which the sections are adapted to be detachably secured together in well known manner.

A seat or sealing ring 15 is mounted in the valve body for receiving the peripheral edge of the valve disk 16 when the latter is in closed position. Since it may be desired to repair or replace the valve seat 15, the latter is preferably disposed in a recess 17, at the joint between the two sections 11 and 12 of the valve housing.

The valve disk 16 is supported from the housing section 12 by a plurality of links 18 and 19.

There is a pair of links 18 and a pair of links 19, one set of links 18, 19 being disposed at one side of the valve disk 16, and the other set of links 18, 19 being disposed at the other side of said valve disk, as shown in Figs. 2 and 3.

In order to provide means by which the links 18 and 19 may be readily mounted in the body of the valve, the housing section 12 is formed with two diametrically disposed cavities 20. These cavities extend laterally outwardly from the upper portion of the valve body. The outer end of each cavity 20 is closed by means of a cover plate 21.

As shown in Figs. 2 and 3, at the inner end of each cavity 20, the body of the valve is formed with a shoulder 22 in which is mounted a pivot pin 23 for the upper end of each link 18, and a pivot pin 24 for the upper end of each link 19. The shoulders 22 present flat vertical surfaces which are disposed in parallel relationship to the longitudinal center line of the valve, and the pivot pins 24 are positioned downstream with respect to the pivot pins 23.

The lower end of each link 18 is pivotally connected to the valve disk 16, by means of a pin 25, and the lower end of each link 19 is pivotally connected to the valve disk 16 by means of a pin 26.

The pivotal connections of the links 18, 19 provided by the pins 23, 24, 25 and 26 are loose so as to permit free swinging movement of the valve disk 16.

The arrangement of the links 18 and 19 and the manner in which said links pivotally connect the disk 16 to the valve housing 12, is such that said pivots are positioned slightly off center of the disk, or off the center of gravity of said disk. By this arrangement of the parts the disk is unbalanced hydraulically so that said disk will close automatically when equal fluid pressures occur on both sides of the disk.

Assuming that the valve device is located at the discharge side of a pump or blower, when the fluid pressure on the upstream side of the valve disk 16 rises to a point where the fluid pressure exceeds the fluid pressure on the downstream side of the valve disk 16, the valve disk moves away from the seat 15 by rotating around the pivots 24 and 25, simultaneously, and in view of the fact that the valve disk 16 is hydraulically unbalanced because of the off center location of the pivots 25, said valve disk has a tendency to rotate about said pivots 25. The links 19 function as tilting links and said links 19 definitely control this rotation of the valve disk 16 and at the same time cause said valve disk to move downstream further away from the seat 15. Finally the valve disk 16 assumes the position shown by broken lines in Fig. 1.

If flow of fluid through the valve device ceases and the fluid pressures become balanced, the valve disk 16, because of its eccentric or off center mounting in the valve body, will swing upstream towards closed position. The valve disk 16 also tends to move towards the seat 15.

Without the tilting links 19, the valve disk 16 could make contact with the seat 15 while it is rotating towards closed position. If such contact took place before full rotation of the valve disk to its original seated position, the disk would become lodged in a partly open position.

The function of the tilting links 19, therefore, is to provide means for cooperating with the supporting links 18 so as to assure complete rotation and lining up of the valve disk with the seat 15, with a simultaneous movement of the valve disk toward the seat 15. In this way a complete and corelated movement of the valve disk from the closed position shown by full lines, Fig. 1, to the wide open position shown by broken lines, and vice versa, is accomplished.

Due to the manner in which the disk 16 is pivotally mounted and moves in the valve housing, the seat 27 of the sealing ring 15 and the seating surface 28 of the disk 16 which engages said seat should be formed with a spherical contour. This spherical joint between the valve disk and its seat is for the proper functioning of the valve. It has been described that the gate or disk 16 has a multiple of motions when it moves from closed to open position and vice-versa. In view of these multiple motions, means should be provided whereby inaccuracies in machining the parts or other causes will allow the valve disk 16 to find a proper seat each time it engages the ring 15. By constructing the seating surface 28 of the disk 16 with a spherical contour and by correspondingly forming the seat 27 of the sealing ring 15, the disk 16 will find a natural position when closed, which position is a product of the motion tilting it, as well as the motion moving it toward the seat.

While the sealing ring 15 is shown as being formed of a separate piece of material, it will be understood that, when so desired, said sealing ring may be formed as an integral part of the valve body.

While I have described the invention in great detail and with respect to the present preferred form thereof, it is not desired to be limited thereto since changes and modifications may be made therein without departing from the spirit of the invention. The invention may be embodied in other specific forms without departing from the essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States of America is:

1. A valve of the type described, comprising a housing, a valve disk, a seat formed in the housing for said valve disk, a pair of supporting links disposed on the downstream side of said valve disk, said supporting links having pivotal connection at one end with said housing and pivotal connection at the other end with said valve disk for supporting the valve disk for rotation towards and away from said seat, said supporting links being arranged in a substantially vertical position when the valve disk is seated in the housing, and a pair of tilting links, each tilting link having pivotal connection at one end with said housing at a point in the housing in spaced relation downstream with respect to the pivotal connection of the supporting links with the housing, said tilting links having pivotal connection at the other end at a point on said valve disk spaced from and above the pivots of said supporting links with the valve disk so that said tilting links are disposed in a substantially inclined position with respect to the supporting links when the valve disk is seated in the housing, said links being constructed and arranged to swing the valve disk away from its seat and to retain said valve disk in a substantially horizontal position within the housing when the flow of fluid exerts a predetermined pressure on the upstream side of the valve disk.

2. A valve of the type described, comprising a housing, a valve disk, a seat formed in the housing for said valve disk, a link disposed on the downstream side of said valve disk, said link having pivotal connection at one end with said housing and pivotal connection at the other end with said valve disk for supporting the valve disk, said supporting link being arranged in a substantially vertical position when the valve disk is seated in the housing, and a second link having pivotal connection at one end with said housing at a point in the housing in spaced relation downstream with respect to the pivotal connection of the supporting link with the housing, said second link having pivotal connection at the other end at a point on said valve disk spaced from and above the pivotal connection of the supporting link with said valve disk so that said second link is disposed in a substantially inclined relation with respect to the supporting link when the valve disk is seated in the housing, said links being constructed and arranged to cause the valve disk to swing away from its seat and to retain said valve disk in a substantially horizontal position within the housing when the flow of fluid exerts a predetermined pressure on the upstream side of the valve disk.

3. A valve of the type described, comprising a housing having a passage formed therein through which fluid is adapted to flow, a valve disk for controlling the flow of fluid, a seat mounted in the housing for said valve disk to engage to cut off the flow of fluid, a link disposed on the downstream side of said valve disk, said link having pivotal connection at one end with said housing and having pivotal connection at the other end with said valve disk for supporting the valve disk, said pivotal connections being loose so as to permit free swinging movement of the valve disk away from and towards its seat, and a second link having pivotal connection at one end with said housing at a point downstream with respect to the connection of said first link with said housing, said second link having pivotal connection with said valve disk at a point intermediate said first link pivots, said links being constructed and arranged to cause the valve disk to assume a substantially horizontal position in the housing as long as the pressure of the fluid acting against the upstream side of the valve disk exceeds a predetermined amount.

4. A valve of the type described, comprising a housing having an upstream section and a downstream section, a valve seat therebetween formed with a spherical sealing surface, a valve member having a spherical sealing surface formed on its periphery for engagement with the spherical sealing surface of said valve seat, a pair of supporting links disposed on the downstream side of said valve member, said supporting links having pivotal connection at one end with said housing and having pivotal connection at the other end with said valve member for supporting the valve member for rotation towards and away from said spherical sealing surface, and a pair of tilting links, each tilting link having pivotal connection at one end with said housing at a point in the housing in spaced relation downstream with respect to the pivotal connection of the supporting links with the housing, said tilting links having pivotal connection at the other end at a point on said valve member spaced from the pivots of said supporting links with the valve member so that said tilting links are disposed at an angle with respect to the disposition of the supporting links, said links being constructed and arranged to swing the valve member in an arc from its seated position away from the spherical sealing surface, whereby the upper portion of the valve member enters the upstream section of the housing as soon as the periphery of the valve member clears the spherical sealing surface of the housing.

5. A valve of the type described, comprising a housing having an upstream section and a downstream section, a valve disk, a seat formed in the housing for said valve disk, a link disposed on the downstream side of said valve disk, said link having pivotal connection at one end with said housing and having pivotal connection at the other end with said valve disk for supporting the valve disk, and a second link having pivotal connection at one end with said housing at a point in the housing in spaced relation with respect to the pivotal connection of the supporting link with the housing, said second link having pivotal connection at the other end at a point on said valve disk spaced from the pivotal connection of the supporting link with said valve disk, said links being constructed and arranged to cause the valve disk to swing in an arc away from its seat whereby the upper portion of the valve disk enters the upstream section of the housing as soon as the periphery of the valve disk clears the valve seat, said links being constructed and arranged to retain said valve disk in a substantially horizontal position within the housing when the flow of fluid exerts a predetermined pressure on the upstream side of the valve disk.

6. A valve of the type described, comprising a housing having an upstream section and a downstream section, a valve seat between said sections formed with a spherical sealing surface, a valve disk having a peripheral spherical sealing surface for engagement with the spherical sealing surface of said valve seat, a pair of links disposed on the downstream side of said valve disk, said links having pivotal connection at one end with said housing and having pivotal connection at the other end with said valve disk for supporting the valve disk, one link having pivotal connection at one end with said housing at a point spaced from the pivotal connection of the other link with said housing, each link having pivotal connection at the other end thereof with said valve disk at spaced points off center of the valve disk, said links being constructed and arranged to swing the valve disk in an arc away from its seated position whereby the upper portion of the valve disk moves into the upstream section of the housing as soon as the periphery of the valve disk clears the seat.

7. A valve of the type described, comprising a housing, a valve disk having a peripheral spherical sealing surface, a seat mounted in the housing and having a spherical sealing surface for engagement with the spherical sealing surface of said valve disk, a pair of links disposed on the downstream side of said valve disk and arranged at each side of the center thereof, said links having pivotal connection at one end with said housing and having pivotal connection at the other end with said valve disk, and a second pair of links having pivotal connection at one end with said housing and having pivotal connection at the other end with said valve disk, the pivotal connections of said second pair of links with said valve disk being disposed with respect to the arrangement of the pivotal connections of the first pair of links with the valve disk so that said valve disk is caused to swing in an arc away from its seat and assumes a substantially horizontal position within the housing as long as the fluid pressure exceeds a predetermined amount, the initial arcuate swinging movement of the valve disk away from its seat causing the upper portion of the valve disk to move into the upstream portion of the housing as the periphery of the valve disk clears the seat in the housing.

ROBERT BISCHOFF.